(12) United States Patent
Salpekar et al.

(10) Patent No.: US 11,526,489 B1
(45) Date of Patent: Dec. 13, 2022

(54) SYSTEM AND METHOD FOR GROUPING AND EXECUTING TRANSACTIONS WHILE ENSURING HYBRID CLOUD CACHE INTEGRITY AND CONSISTENCY

(71) Applicant: Egnyte, Inc., Mountain View, CA (US)

(72) Inventors: Ajay Salpekar, Mountain View, CA (US); Sanjay Kulkarni, Mountain View, CA (US); Bhaskar Guthikonda, Mountain View, CA (US)

(73) Assignee: Egnyte, Inc., Mountain View, CA (US)

( * ) Notice: Subject to any disclaimer, the term of this patent is extended or adjusted under 35 U.S.C. 154(b) by 2 days.

(21) Appl. No.: 17/336,734

(22) Filed: Jun. 2, 2021

Related U.S. Application Data (60) Provisional application No. 63/034,292, filed on Jun. 3, 2020.

(51) Int. Cl.
*G06F 16/00* (2019.01)
*G06F 16/23* (2019.01)
*H04L 67/568* (2022.01)

(52) U.S. Cl.
CPC ...... *G06F 16/2365* (2019.01); *G06F 16/2379* (2019.01); *H04L 67/568* (2022.05)

(58) Field of Classification Search
None
See application file for complete search history.

(56) References Cited

U.S. PATENT DOCUMENTS

| 9,747,288 | B1* | 8/2017 | Beckford | G06F 16/2365 |
| 2012/0023369 | A1* | 1/2012 | Bourbonnais | G06F 16/2386 714/E11.131 |
| 2017/0075735 | A1* | 3/2017 | Pradeep | G06F 16/16 |
| 2020/0379978 | A1* | 12/2020 | Wright | G06F 16/2477 |

* cited by examiner

*Primary Examiner* — Anhtai V Tran
(74) *Attorney, Agent, or Firm* — FisherBroyles LLP; Alan D. Minsk (57) ABSTRACT

A system and methods for grouping and executing transactions concurrently while ensuring hybrid cloud cache integrity and consistency. The system identifies upload operations in a journal and associates each such operation with an upload transaction. The upload operations may be grouped into a group of concurrently executed upload operations. If an upload transaction finishes uploading a file and there is a most recent older upload transaction having a pending upload, then the system adds the completed transaction and a dependency queue associated with that transaction to a dependency queue of the most recent older upload transaction. If the current upload transaction finishes the upload operation and the transaction has an oldest transaction identifier of the group, then the system adds a PUSHDONE record for that transaction to a hybrid cloud cache journal along with a PUSHDONE record for the other transactions depending on that completed transaction.

20 Claims, 2 Drawing Sheets

SYSTEM AND METHOD FOR GROUPING AND EXECUTING TRANSACTIONS WHILE ENSURING HYBRID CLOUD CACHE INTEGRITY AND CONSISTENCY

CROSS REFERENCE TO RELATED APPLICATION

This application claims the benefit of U.S. Provisional Application No. 63/034,292, titled "System And Method For Grouping And Executing Transactions While Ensuring Hybrid Cloud Cache Integrity And Consistency," filed Jun. 3, 2020, the disclosure of which is incorporated, in its entirety herein, by this reference.

FIELD OF THE DISCLOSURE

The present application relates to cloud technologies, data storage technologies, synchronization technologies, caching technologies, computing transaction grouping technologies, data consistency and integrity technologies, and more particularly, to a system and method for implementing a consistent and persistent hybrid cloud cache.

BACKGROUND

A hybrid cloud is a computing architecture that combines an on-premise data center with a public cloud environment. Hybrid cloud caches are local data storage elements used in conjunction with a public cloud-based data storage and serve as an important component of internet applications, as they help achieve improved throughput and increased data access speeds. Conventionally, such caches persist data and metadata regarding operations or transactions on a local file system. The integrity of data stored locally by a hybrid cloud cache may be ensured by implementing a journaling system, where a system adds records representing user requested operations to a journal. Thus, the journaling system may be a data storage location where records are added to represent operations initiated by a user or by a computing system at the direction of a user, and the backing store for a journal may comprise disk blocks. Journals may also be referred to as logs and the two terms are often used interchangeably.

When using a journal, user transactions and the associated operations are typically described using as little storage space as possible. At a high level, such operations may be classified into two types or categories of operations. The first type of operation may comprise data operations, which typically involve the local cache being used to upload data or files to, or download data or files from, the cloud system or platform. The second type of operation may comprise metadata operations, which typically involve the local cache being used to perform operations where data itself is not involved. For example, such metadata operations may include, but are not limited to, folder or file rename and delete operations.

For practical reasons of local storage capacity, journals cannot grow indefinitely and typically must wrap-around, where this refers to a journaling system having the ability to overwrite old records without a system losing data or metadata. The ability to overwrite or wrap-around for a journal is dependent upon the operations described by the journal records having been completed and the associated data, file, or metadata having reached a final destination (such as a cloud-based platform), and so may be removed from the local hybrid cloud cache.

User initiated transactions often include (or result in) a mix of data and metadata operations. Data operations, which involve transfer of the actual data, typically take a longer time to complete than metadata operations. In some situations, each of the operations to be performed may be assigned monotonously increasing numbers referred to as transaction identifiers. In order to maintain consistency and ensure the integrity of the hybrid cloud cache, the transactions may be "pushed" to the cloud in the same order that they appear in the hybrid cloud cache, that is in the numerical order of the transaction identifiers. Transactions may also be marked PUSHDONE (i.e., completed) or identified in a similar manner in the local journal in the same order.

Due to this constraint, data operations such as uploading files (which can take a relatively long time to complete compared to other data operations or metadata operations), may result in an accumulation of transactions in the cache, slower system performance, and prevent or limit the ability to perform journal wrap-arounds and overwrites. This can be inefficient, as data operations may slow down completing the processing of transactions, leading to an accumulation of transactions waiting to be processed. This may be a particular problem with transactions involving the transfer of large files or other forms of data.

From the vantage point of a hybrid cloud cache, operations performed through it (i.e., using the local cache as a data storage to record a transaction or operation) are referred to as Explicit Transactions (or write-through transactions), while operations that are performed directly in the cloud, i.e., around or without use of the cache, are referred as Implicit Transactions (or write-around transactions).

While current technologies and methodologies for using hybrid cloud computing architectures provide benefits and efficiencies, such technologies and methodologies still have disadvantages. One of these disadvantages is in maintaining proper synchronization between the contents of a persistent local cache and a cloud-based data storage, particularly when a system architecture incorporates a mixture of Explicit and Implicit transactions. Embodiments of the system, apparatuses, and methods described herein are directed to processes and techniques which assist in presenting a consistent view of a cached namespace while preserving its integrity, and in overcoming possible inefficiencies caused by the execution of operations involving data transfers between a local cache and a cloud storage element.

SUMMARY

The terms "invention," "the invention," "this invention," "the present invention," "the present disclosure," or "the disclosure" as used herein are intended to refer broadly to all of the subject matter described in this document, the drawings or figures, and to the claims. Statements containing these terms should be understood not to limit the subject matter described herein or to limit the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

As will be described, conventional methodologies and technologies used in managing a hybrid cloud computing architecture or other system that includes a hybrid cloud cache may be modified and/or enhanced by using an embodiment of the system, apparatuses, and methods described herein to provide a more optimized caching performance, along with enhanced data consistency and integrity. In some embodiments, this may include providing more effective handling of Explicit and Implicit transactions occurring in (through) and around (bypassing) a persistent local cache. Such enhancements and improvements to conventional methodologies and technologies may provide improved efficiency, improved data consistency, improved data integrity, improved speed, improved redundancy, improved long-term and short-term performance, reduced costs, and increased ease-of-use.

A system and accompanying methods for grouping and executing transactions or operations while ensuring hybrid cloud cache integrity and consistency are disclosed herein. In particular, the system and methods provide techniques that enable grouping a set of transactions and associated upload operations, followed by the concurrent execution of the grouped transactions or operations, without compromising the transactional integrity of a hybrid cloud cache.

The system and methods described herein address and overcome the limitations and disadvantages associated with current approaches, which typically involve pushing transactions to the cloud serially and sequentially (i.e., in the same order that they are entered into a hybrid cloud cache). As mentioned, this approach leads to longer times to finish certain types of data operations, a possible accumulation of transactions in the local cache, slower system performance, and preventing efficient use of journal wrap-around and overwrite functionality.

In some embodiments, the system and methods described herein employ a "greedy" approach to look ahead in a journal of a journaling system of a hybrid cloud cache. In a general sense, this refers to grouping as many transactions as possible subject to limitations imposed by memory capacity, bandwidth, the number of available connections, or other resources in the hybrid cloud cache or in the cloud. The look ahead capability is used to identify a set of upcoming (and typically all) operations of the same type or having a similar characteristic, where the operations may be implemented as part of multiple transactions. The process groups those operations together and includes logic that provides a way to serialize records (e.g., PUSHDONE records) to preserve the consistency and integrity of the hybrid cloud cache. In some embodiments, this may result in grouping a set of transactions corresponding to similar operations out-of-order and scheduling them for concurrent execution. However, based on the processes and logic described, the transactions can be executed concurrently without compromising the transactional integrity of the hybrid cloud cache.

In some embodiments, the operations are upload operations of data or files, where at least some of the uploads may be associated with different transactions. In this example, the system and methods described facilitate faster uploads by looking ahead in the journal and grouping the uploads together without compromising the consistency and integrity provided by the journaling system, and by leveraging the cloud's capability to handle multiple streams of connections at the same time. This capability facilitates multiple, concurrent, and parallel execution of a set of grouped transactions (which causes a corresponding set of operations to be performed), such as those corresponding to file or data uploads.

As described, in some embodiments, the functionality facilitated and provided by the system and methods described herein are based on at least two primary features. First, the system and methods incorporate functionality that allows for the grouping of operations and their corresponding transactions, such as operations associated with uploading files. Second, the system and methods implement concurrent execution of a group of transactions, such as concurrent upload of multiple files or sets of data to the cloud. Further, the system and methods execute logic so that the multiple uploads may be performed concurrently without compromising the consistency and integrity of the cache journaling system.

In one embodiment, a system for grouping and executing transactions concurrently while ensuring hybrid cloud cache integrity and consistency is disclosed. The system may include a memory that stores a set of computer-executable instructions and a processor or processors that execute the instructions to perform operations of the system.

In some embodiments, the system receives a request or requests from a user (typically via a client device or process) to perform one or more operations. The operations may include data and metadata operations. The data operations may include file upload operations. Each requested operation is used to create a corresponding transaction for purposes of recording and tracking the operation in a journaling system of the hybrid cloud cache. Thus, there is a one-to-one mapping between a user requested operation and a corresponding transaction; in one sense, a user "sees" the request as an operation and the hybrid cloud cache "sees" it as a transaction.

In some embodiments, the system may perform an operation that includes identifying a plurality of data or file upload operations requested by the user. The system may also perform an operation that includes associating each identified upload operation with its corresponding transaction in a hybrid cache journal, where when executed, the transaction would result in performing the upload operation. Additionally, the system may perform an operation that includes determining a transaction identifier assigned to each of the transactions by the hybrid cloud cache. In some embodiments, the transaction identifier may comprise a number, and the number assigned to each transaction may be configured to increase in value based on an order in which each transaction was created in the hybrid cloud cache journaling system.

The system may further perform an operation that includes grouping the file upload operations into a group or set of upload operations. The system may also perform a process or operation to initiate a concurrent upload of the files associated with the group or set of file upload operations. The concurrent upload(s) may be implemented by establishing a set of connections between the hybrid cloud cache and the cloud platform, with each such connection providing a path for the upload of a file. The system may also implement or execute logic that may comprise one or more data processing steps or decisions that operate to:

Determine that a file has finished uploading, and hence that one of the upload operations from the group has been completed and the corresponding transaction has been executed, where this transaction is referred to as $T_i$, where (i) is a number in a sequence;

Given the execution of transaction $T_i$ (i.e., an upload operation associated with the transaction has been completed), determine if there is another transaction associated with an upload operation in the group or set of upload operations that has an older transaction identifier (i.e., one that is earlier in a sequence of transaction identifiers, meaning that it entered the cache before Ti) and that has a pending upload;
 i.e., determine if there is a Tj where j<i, and Tj has not yet been executed (the file upload operation associated with the transaction has not yet completed);
  if there is such a transaction Tj, then determine if there is no transaction Tk which is unexecuted with Tj<Tk (meaning that Tj is the most recent unexecuted or unfinished transaction in the group), then;
   add Ti and its dependency queue to the dependency queue of Tj;
  if there is such a transaction Tk (meaning that Tk is the most recent unexecuted or unfinished transaction in the group), then add Ti and its dependency queue to the dependency queue of Tk;
If the executed transaction Ti finishes uploading the file associated with the transaction and the transaction Ti has the oldest transaction identifier (e.g., the earliest in a sequence of transaction identifier numbers) of the transactions associated with the group or set of upload operations, then:
 add Ti to the hybrid cache journal (i.e., note the transaction as PUSHDONE in the journal) along with other transactions that depend on the transaction Ti (i.e., those in its dependency queue).

In another embodiment, a method for grouping and executing transactions concurrently while ensuring hybrid cloud cache integrity and consistency is disclosed. In some embodiments, the method may include receiving a request or requests from a user (typically via a client device or process) to perform one or more operations. The operations may include data and metadata operations. The data operations may include file upload operations. Each requested operation is used to create a corresponding transaction for purposes of recording and tracking the operation in a journaling system of the hybrid cloud cache.

The method may also include identifying a plurality of data or file upload operations requested by the user. The method may include associating each identified upload operation with its corresponding transaction in a hybrid cache journal, where when executed, the transaction would result in performing the upload operation. Additionally, the method may include determining a transaction identifier assigned to each of the transactions by the hybrid cloud cache. In some embodiments, the transaction identifier may comprise a number, and the number assigned to each transaction may be configured to increase in value based on an order in which each transaction was created in the hybrid cloud cache journaling system.

The method may further include grouping the file upload operations into a group or set of upload operations. The method may also include initiating a concurrent upload of the files associated with the group or set of file upload operations. The concurrent upload(s) may be implemented by establishing a set of connections between the hybrid cloud cache and the cloud platform, with each such connection providing a path for the upload of a file. The method may also include implementing or executing logic that may comprise one or more data processing steps or decisions that operate to:
 Determine that a file has finished uploading, and hence that one of the upload operations from the group has been completed and the corresponding transaction has been executed, where this transaction is referred to as Ti, where (i) is a number in a sequence;
 Given the execution of transaction Ti (i.e., an upload operation associated with the transaction has been completed), determine if there is another transaction associated with an upload operation in the group or set of upload operations that has an older transaction identifier (i.e., one that is earlier in a sequence of transaction identifiers, meaning that it entered the cache before Ti) and that has a pending upload;
  i.e., determine if there is a Tj where j<i, and Tj has not yet been executed (the file upload operation associated with the transaction has not yet completed);
   if there is such a transaction Tj, then determine if there is no transaction Tk which is unexecuted with Tj<Tk (meaning that Tj is the most recent unexecuted or unfinished transaction in the group), then;
    add Ti and its dependency queue to the dependency queue of Tj;
   if there is such a transaction Tk (meaning that Tk is the most recent unexecuted or unfinished transaction in the group), then add Ti and its dependency queue to the dependency queue of Tk;
 If the executed transaction Ti finishes uploading the file associated with the transaction and the transaction Ti has the oldest transaction identifier (e.g., the earliest in a sequence of transaction identifier numbers) of the transactions associated with the group or set of upload operations, then:
  add Ti to the hybrid cache journal (i.e., note the transaction as PUSHDONE in the journal) along with other transactions that depend on the transaction Ti (i.e., those in its dependency queue).

According to yet another embodiment, a set of computer-executable instructions for grouping and executing transactions concurrently while ensuring hybrid cloud cache integrity and consistency is disclosed. The instructions, when executed by a programmed processor or processors, may cause the processor or processors (or a device or apparatus in which the processor or processors are contained) to perform operations including:
 receiving a request or requests from a user (typically via a client device or process) to perform one or more operations. The operations may include data and metadata operations. The data operations may include file upload operations. Each requested operation is used to create a corresponding transaction for purposes of recording and tracking the operation in a journaling system of the hybrid cloud cache;
 identifying a plurality of data or file upload operations requested by the user;
 associating each identified upload operation with its corresponding transaction in a hybrid cache journal, where when executed, the transaction would result in performing the upload operation;
 determining a transaction identifier assigned to each of the transactions by the hybrid cloud cache;
  the transaction identifier may comprise a number, and the number assigned to each transaction may be configured to increase in value based on an order in which each transaction was created in the hybrid cloud cache journaling system;
 grouping the file upload operations into a group or set of upload operations;

initiating a concurrent upload of the files associated with the group or set of file upload operations;
  the concurrent upload(s) may be implemented by establishing a set of connections between the hybrid cloud cache and the cloud platform, with each such connection providing a path for the upload of a file.

implementing or executing logic that may comprise one or more data processing steps or decisions that operate to:
  determine that a file has finished uploading, and hence that one of the upload operations from the group has been completed and the corresponding transaction has been executed, where this transaction is referred to as Ti, where (i) is a number in a sequence;
  given the execution of transaction Ti (i.e., an upload operation associated with the transaction has been completed), determine if there is another transaction associated with an upload operation in the group or set of upload operations that has an older transaction identifier (i.e., one that is earlier in a sequence of transaction identifiers, meaning that it entered the cache before Ti) and that has a pending upload (i.e., determine if there is a Tj where j<i, and Tj has not yet been executed—the file upload operation associated with the transaction has not yet completed);
  if there is such a transaction Tj, then determine if there is no transaction Tk which is unexecuted with Tj<Tk (meaning that Tj is the most recent unexecuted or unfinished transaction in the group), then;
    add Ti and its dependency queue to the dependency queue of Tj;
  if there is such a transaction Tk (meaning that Tk is the most recent unexecuted or unfinished transaction in the group), then add Ti and its dependency queue to the dependency queue of Tk;
  If the executed transaction Ti finishes uploading the file associated with the transaction and the transaction Ti has the oldest transaction identifier (e.g., the earliest in a sequence of transaction identifier numbers) of the transactions associated with the group or set of upload operations, then:
    add Ti to the hybrid cache journal (i.e., note the transaction as PUSHDONE in the journal) along with other transactions that depend on the transaction Ti (i.e., those in its dependency queue).

These and other features of the systems and methods for grouping and executing transactions while ensuring hybrid cloud cache integrity and consistency are described in the following detailed description, drawings, and appended claims. Other objects and advantages of the systems and methods described will be apparent to one of ordinary skill in the art upon review of the detailed description and the included figures. Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the forms disclosed. Rather, the present disclosure covers all modifications, equivalents, and alternatives falling within the scope of the appended claims.

BRIEF DESCRIPTION OF THE DRAWINGS

Embodiments of the system and methods in accordance with the present disclosure will be described with reference to the drawings, in which.

Note that the same numbers are used throughout the disclosure and figures to reference like components and features.

DETAILED DESCRIPTION

The subject matter of embodiments of the present disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure will be described more fully herein with reference to the accompanying drawings, which form a part hereof, and which show, by way of illustration, exemplary embodiments by which the disclosure may be practiced. The disclosure may, however, be embodied in different forms and should not be construed as limited to the embodiments set forth herein; rather, these embodiments are provided so that this disclosure will satisfy the statutory requirements and convey the scope of the disclosure to those skilled in the art.

Among other things, the present disclosure may be embodied in whole or in part as a system, as one or more methods, or as one or more devices. Embodiments of the disclosure may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, controller, etc.) that is part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, the set of instructions may be conveyed to a user through a transfer of instructions or an application that executes a set of instructions (such as over a network, e.g., the Internet). In some embodiments, a set of instructions or an application may be utilized by an end-user through access to a SaaS platform or a service provided through such a platform.

In some embodiments, one or more of the operations, functions, processes, or methods described herein may be implemented by a specialized form of hardware, such as a programmable gate array, application specific integrated circuit (ASIC), or the like. Note that an embodiment of the inventive methods may be implemented in the form of an application, a sub-routine that is part of a larger application, a "plug-in", an extension to the functionality of a data processing system or platform, or other suitable form. The following detailed description is, therefore, not to be taken in a limiting sense.

Figure 1:
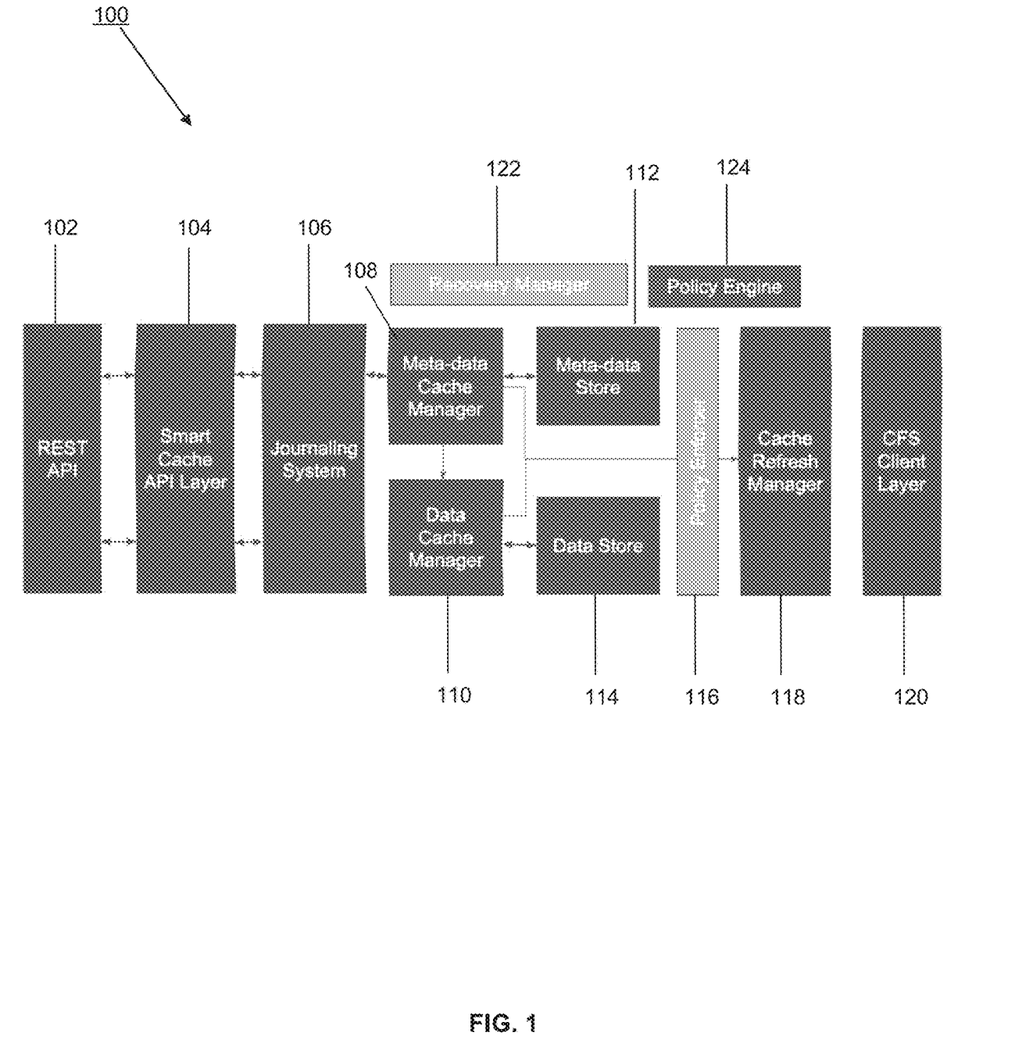
FIG. 1 is a schematic diagram illustrating a system including components for supporting functionality for grouping and executing transactions while ensuring hybrid cloud cache integrity and consistency, in accordance with some embodiments.

FIG. 1 is a schematic diagram illustrating a system 100 including components for supporting functionality for grouping and executing transactions while ensuring hybrid cloud cache integrity and consistency, in accordance with some embodiments. In particular, the system and methods incorporate and provide techniques that perform grouping of upload operations and their associated transactions and execute those transactions concurrently without compromising the transaction integrity of a hybrid cloud cache. The system 100 may be configured to support, but is not limited to supporting, caching services, hybrid cloud services, cloud services, transaction system services, content delivery services, monitoring services, cloud computing services, satellite services, telephone services, voice-over-internet protocol services (VoIP), software as a service (SaaS) applications, platform as a service (PaaS) applications, gaming applications and services, social media applications and services, operations management applications and services, productivity applications and services, mobile applications and services, and other computing applications and services.

In some embodiments, the system 100 may be included within another system, may be a separate system from another system, and/or may be a subsystem of another system. System 100 may be implemented, at least in part, as a set of computer-executable instructions that when executed by a suitably programmed processor, cause the processor or a server or device of which the processor is a part, to perform one or more of the methods, functions, operations, or processes described herein.

The system 100 may include, but is not limited to including, a REST Application Programming Interface (API) 102 (or other API), a smart cache API layer 104 (or other API layer), a journaling system 106 (which may include any number of journals), a metadata cache manager 108, a data cache manager 110, a metadata store 112, a data store 114, a policy enforcer 116, a cache refresh manager 118, a cloud-file-storage (CFS) client layer 120, a recovery manager 122, and a policy engine 124. The system 100 may include a hybrid cloud cache that may utilize the various components of the system 100 and may communicatively link and upload data to and/or download data from a cloud system. The REST API 102 may serve as the interface between user devices and/or other devices and applications supporting the functionality of the system 100. The REST API 102 may be configured to receive API calls from clients (e.g., to access a cache and/or to perform other functions), such as from user devices. The smart cache API layer 104 may serve as an intermediary between the REST API 102 and the journaling system 106 and the other components of the system 100, such as, but not limited to, the cloud-file-storage system and/or other components or applications of the system 100.

The journaling system 106 may include one or more journals. One or more of the journals may be configured to record transactions associated with operations requested by a user (including, for example, data and metadata associated with the operations). The metadata may be information that describes the data and/or operations, what is in the data, and/or the type of operation. In some embodiments, the journals may be a circular log, buffer, and/or other data structure. In some embodiments, the journals may transfer records containing information associated with the operations to the cloud, such as to a cloud-based platform or system. Once the records are transferred to the cloud, the records may be deleted from (or overwritten in) the journal(s). The journal(s) may be utilized to ensure that the operations requested by users/clients are carried out and performed, even if the system 100 crashes or suffers another type of interruption. Data and metadata associated with the operations may be managed by the data cache manager 110 and the metadata cache manager 108, respectively. In some embodiments, the records including the data and metadata may be stored in the data store 114 and the metadata store 112, respectively.

The system 100 may include a policy enforcer 116, which may be configured to enforce the policies and rules associated with the system 100. The cache refresh manager 118 may be configured to refresh a cache in the system 100. For example, the cache refresh manager 118 may be configured to ensure that data and/or metadata recently stored in a particular cache is current and/or accurate. The system 100 may also include a cloud-file-storage (CFS) system client layer 120, which may be utilized to facilitate providing records associated with the operations from the journal(s) to the cloud-based file-storage system. Additionally, the system 100 may include a recovery manager 122, which may be configured to recover un-pushed data and/or metadata and to ensure that the integrity of the data in the journals and/or caches of the system 100 is preserved. The system 100 may further include a policy engine 124, which may be configured to generate and/or conduct various operations associated with policies and/or rules to be utilized with the system 100.

With regards to policy engine 124, examples of policies that may be implemented by the engine include but are not limited to, or required to include the following:

a) Storage Management policies (e.g., how much disk space should be used by the cache);
b) Caching policies—what should be cached, what part of cache should be updated and when; and
c) Eviction policies—What should be evicted/removed from cache if there is a need to do so.

In some embodiments, one or more policies may be implemented in whole or in part by a rule-base, a trained machine learning model, or other decision process.

As an example, the system 100 may operate in the following manner. The hybrid cloud cache of the system 100 may generate two unique identifiers to track each file (or data set) uploaded by a user into the system 100 and/or to the local hybrid cloud cache. The first unique identifier may identify the file (or data set) itself and the second unique identifier may identify the version of the file (or data set). In some embodiments, each file upload operation initiated or caused to occur by a user may also be associated with a transaction (which may be referred to as an "upload transaction"). In a typical scenario, the system 100 may select each such transaction one at a time (and in the order of the assigned identifiers), "push" the file or data set that is to be uploaded to the cloud, and mark the transaction as PUSHDONE (completed) in the journal of the hybrid cloud cache.

However, as an alternative to this approach, the system 100 may facilitate looking ahead in the journal entries and identifying a set of data operations, such as upload operations, and in response group those operations into one or more groups. Each group containing upload operations may be uploaded to the cloud concurrently, such as by uploading each file using a separate connection to the cloud platform. Once the files in a grouping are uploaded, an entry indicating that the upload operation is completed (e.g., a PUSHDONE entry) may be entered for each corresponding transaction in the journal of the hybrid cloud cache. In some embodiments, this may be performed in the same order as the transaction identifiers (Tn) for the transactions associated with the upload operations. The transaction identifiers are typically assigned to a transaction created in the hybrid cloud cache in a sequence corresponding to the order in which the transactions are created. In general, the cache journaling system writes PUSHDONE records in sequential order. As an example, the PUSHDONE for transaction Tn cannot be written until the PUSHDONE for Tn−1 has been written, even if Tn is pushed to the cloud before Tn−1. The journaling system typically operates in this way because writing PUSHDONE in sequential order reduces the complexity associated with other aspects of the journaling system, such as replay and reservation management.

In an example use case, a file B may be uploaded to the cloud by a transaction Tn; however, transaction Tn cannot be marked by the system 100 as being completed (PUSHDONE) in the cache journal even though transaction Tn finished its associated upload operation before the system uploaded file A associated with transaction Tn−1. This can create a problem in a conventional system, as in such systems, the journaling subsystem processes transactions in the sequential order of the transaction identifier. In this example, this means that the journaling system will not write a PUSHDONE record for transaction Tn in the journal until the file upload operation associated with transaction Tn−1 has been executed.

As a result, and to ensure proper ordering, in some embodiments, the system 100 maintains a dependency queue for transactions. Each item in the dependency queue is a record that includes information regarding a transaction. This information may include but is not limited to or required to include the transaction identifier and the type of operation associated with the transaction. In some embodiments, the transaction identifier in the dependency queue may be used to locate a transaction (data) structure which contains additional information about the transaction. The additional information may include the transaction creation time, transaction size, etc. This additional information is typically not used by the dependency queue but may be used by the journaling system in another context. As an example, in some embodiments, the information in the transaction structure may be used to assist in grouping of transactions of different types which are dependent on each other (e.g., working on the same file or folder).

More specifically, when a file is uploaded to the cloud, the system 100 may perform one or more actions depending on which transaction has finished executing, i.e., uploading a file (or data). For example, if a transaction finishes uploading a file, but there is a transaction with an older (earlier) transaction identifier that has a pending upload to the cloud (and in the group of upload operations formed from the described methods), then the finished transaction and its dependency queue may be added to the dependency queue of the older, pending transaction. If there are multiple older, pending transactions, then the dependency queue of the finished transaction may be added to the dependency queue of the youngest (latest or most recent) of the pending or unexecuted transactions.

However, if the finished transaction is associated with the oldest (earliest) transaction identifier in the group (e.g., the transaction associated with the operation had arrived in the system 100 earlier than other transactions that when executed would implement the upload or other "grouped" operation), then the PUSHDONE record is added to the journal for the finished (completed) transaction along with the PUSHDONE for all the transactions that depend on the finished transaction. When the PUSHDONE record for the finished transaction is added to the journal, the system 100 may remove the finished transaction from the group of upload operations it was associated with.

Since the system 100 groups the uploads (or other operation) together, the time consumed for uploading a group of files is the same as the time required for the slowest upload operation. In some embodiments, implementation of the functionality provided by the system 100 may result in twenty-five to thirty percent better performance for the same dataset and the same set of operations.

Note that although some embodiments of the system and methods described herein have been described with reference to the grouping of a set of upload operations, the same techniques and logic may be used to group and concurrently execute other types of operations. Thus, while embodiments have been described as implementing a grouping of upload operations and executing the corresponding transactions concurrently by utilizing more of the available bandwidth, other embodiments may group transactions for concurrent processing that meet at least one of the following criteria:

Transactions that create new objects (e.g. UPLOAD_FILE, CREATE_FOLDER); and

Transactions that do not have a dependency on another transaction in the group.

In such a situation, the system and its described elements and logic will write PUSHDONE records for each of the transactions in the group in the correct order, as the operations in the group may take different times to finish.

Based on the foregoing, the system 100 executes a set of upload (or other) operations in less time by looking ahead in a journal and grouping uploads together, using the described logic to maintain the consistency and integrity provided by a journaling system, and by leveraging the capability of the cloud to handle multiple streams of connections simultaneously. In some embodiments and depending on the available connections, multiple such groups may be uploaded concurrently to the cloud. For example, if there are 1000 files which can be grouped by the system 100, the system 100 may create multiple groups to accommodate the 1000 files. Once the multiple groups are created, the system 100 may then upload some or all these groups to the cloud concurrently.

As another example use-case, if there are five files that are uploaded in a group and the first file is the largest file and therefore takes the longest time to process and upload, and the next four files are small files and are uploaded sooner than the first file, then the system 100 may mark the last four files as completed (PUSHDONE) once the first file upload is completed (PUSHDONE). In this example, the dependency queue would indicate that the next four files are dependent on completion of the upload of the first file.

Figure 2:
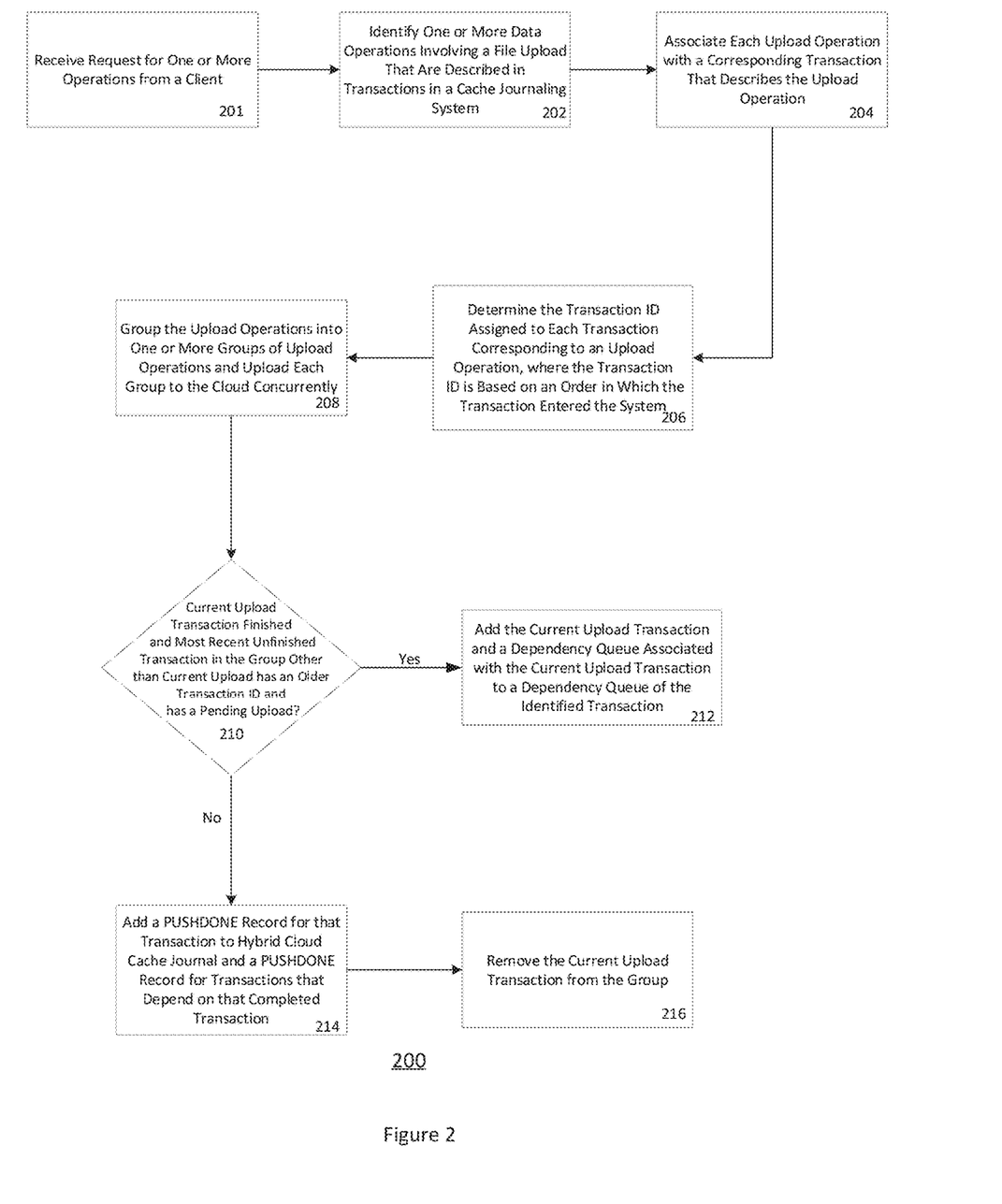
FIG. 2 is a flow chart or flow diagram illustrating an example process, operation, method, or function for implementing a consistent and persistent hybrid cloud cache, in accordance with some embodiments.

FIG. 2 is a flow chart or flow diagram illustrating an example process, operation, method, or function for implementing a consistent and persistent hybrid cloud cache, in accordance with some embodiments. Note that many combinations of the components, devices, programs, and/or networks of the system 100 may execute and/or implement one or more of the functions or processes described with reference to FIG. 2.

As shown in FIG. 2, an exemplary method 200 for grouping and executing transactions while ensuring hybrid cloud cache integrity and consistency is illustrated. In one embodiment, the method 200 may proceed as follows: At step 201, the method 200 may include receiving, via a request from a client device, process, or application (representing a user), one or more requests for operations. The operations may include data operations associated with uploading a file (or set of data) to a cloud platform or system. The journaling system of the hybrid cloud cache creates a record of a corresponding transaction for each requested operation.

In some embodiments, at step 202 the method 200 may include identifying file upload operations (or another specific type of operation) within the data operations described in transactions in a journal of a hybrid cloud cache. At step 204, the method 200 may include associating each file upload operation with its corresponding transaction. At step 206, the method 200 may include determining a transaction identifier assigned by the hybrid cloud cache for each transaction corresponding to an upload operation. In some embodiments, the transaction identifier may be a number (or other type of identifier). The number (or other identifier) assigned to a particular transaction by the system 100 may correspond with the order in which the transaction entered the hybrid cloud cache of system 100. For example, transaction identifier number 1 may be utilized with the first upload transaction that entered the system, transaction identifier number 2 may be utilized with the second upload transaction that entered the system, and so forth.

At step 208, the method 200 may include grouping the file upload operations into a group or set of upload operations (or into multiple groups of upload operations). In some embodiments, the grouping may include grouping the upload operations into multiple groups, some or all of which may be uploaded concurrently to the cloud. At step 210, the method 200 may include determining if when a transaction finishes uploading a file, there is a most recent unfinished transaction in the group that is associated with an older (earlier) transaction identifier than the finished (executed) transaction. If so, the method 200 may proceed to step 212, which may include adding the current executed upload transaction and a dependency queue associated with the current upload transaction to a dependency queue of the other transaction (i.e., the most recent transaction in the group that is associated with an older (earlier) transaction identifier and which has a pending upload).

For example, if there are upload transactions 1, 2, 3, 4, and 5, and a file associated with upload transaction 5 has finished uploading to the cloud and the file associated with upload transaction 4 has not yet been uploaded, then the upload transaction 5 and its dependency queue may be added to the dependency queue of transaction 4. In this example, transaction 4 would be the most recent older upload transaction with respect to transaction 5 that has a pending upload.

As another example, if there are upload transactions 1, 2, 3, 4, and 5, and the files associated with transactions 2 and 5 have been uploaded to the cloud and the files associated with transactions 1, 3, and 4 have not yet been uploaded to the cloud, then transaction 2 and its dependency queue may be added to the dependency queue of transaction 1, and transaction 5 and its dependency queue may be added to the dependency queue of transaction 4.

If, however, at step 210, a transaction finishes uploading the file associated with the transaction and the transaction has the oldest transaction identifier of the group (i.e., there is no older or earlier unfinished transaction in the group of transactions associated with the group of operations), then the method 200 may proceed to step 214, which may include adding the PUSHDONE for the current transaction to the cache journal along with the PUSHDONE for other transactions that were depending on (i.e., contained in the dependency queue of) the current transaction.

At step 216, the method 200 may include removing the (upload) transaction from the group of transactions associated with the group of operations when the (upload) transaction is added to the cache journal. In some embodiments, the method 200 may continue to operate as additional user requested operations and associated transactions are received and/or processed by the system 100. Further, the method 200 may incorporate one or more of the features and functionality described for the system 100, other method disclosed herein, or as otherwise described herein.

As a further example of the operation of the system and methods described herein:

Users connected to a hybrid cloud cache have requested that operations be performed. Among these operations, assume there are 4 file upload operations to the hybrid cloud cache, represented as UO1, UO2, UO3, UO4, followed by a rename folder operation (represented as RO1), followed by additional upload file operations represented as UO5, UO6 . . . UOn;

Each of these user operations is associated with a corresponding transaction created by the journaling system in the Hybrid Cloud Cache:

The first 4 upload file operations (UO1 . . . UO4) are represented as T1 . . . T4 in the transaction records in the cache, the rename folder operation is represented as transaction T5, and the remaining upload file operations, UO6 . . . UOn are represented as transactions T6, T7 . . . Tn;

These transactions and their payload (which identifies the user requested operation) are written into the cache journal in the sequential order of the transaction identifiers;

These are Explicit transactions, where TI is the oldest and Tn is the youngest transaction (the notation Tn−1<Tn refers to Tn−1 being older than Tn);

In one embodiment, Transactions T1 . . . T4 representing the operations UO1 . . . UO4 are grouped. T5 is not included in the group because it is an operation of a different type;

There is no theoretical limit on the group size, with the limitations being resource availability (such as memory and bandwidth).

Writing PUSHDONE Records in the Correct Order

Since the transactions corresponding to the upload operations in the group are executed concurrently, they may finish in any order, and it is important to make sure that the PUSHDONE records are not written out of order. In some embodiments, each transaction has an associated dependency queue to ensure that PUSDONE records are written in order. As described, this may be accomplished in the following manner:

When a transaction Ti in the group finishes and there is an unfinished transaction Tj, where Tj<Ti (meaning Tj is "older" and entered the cache before Ti) and there is no Tk which is unfinished with Tj<Tk (meaning that Tj is the oldest unfinished transaction in the group), Ti is added to the dependency queue of Tj;

if there is such a transaction Tk (meaning that Tk is the most recent unexecuted or unfinished transaction in the group), then add Ti and its dependency queue to the dependency queue of Tk; and If there is no such Tj, then the PUSHDONE record(s) are written for Ti and for all the transactions in the dependency queue of Ti itself.

The following example further illustrates how out of order transaction completions may be handled by an embodiment of the system and methods described herein:

1. Transactions finish in the following order: T3, T4, T2, T1;
2. When T3 finishes, it is added to the dependency queue of T2 and T3 is removed from the group;
3. When T4 finishes, it is added to the dependency queue of T2 since T3 is not active anymore;
4. When T2 finishes, T2 along with all the transactions in dependency queue (i.e., T3 and T4) are added to the dependency queue of TI; and
5. When T1 finishes, PUSHDONE records are written for TI and for all the transactions in its dependency queue (i.e., T2, T3, T4).

Note that the above logic ensures that all PUSHDONE records are written in the order of the corresponding transaction identifiers.

As described, the system and methods operate to group a set of the transactions, execute those transactions concurrently and use a dependency queue to write PUSHDONE for a transaction into a journal in the correct order, even in a situation where the transactions finish out of order when executed concurrently.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover all adaptations or variations of various embodiments and arrangements of the described system and methods. Combinations of the above arrangements, and other arrangements not specifically described herein, will be apparent to those of skill in the art upon reviewing the disclosure. Therefore, it is intended that the disclosure not be limited to the particular arrangement(s) disclosed but to include all embodiments and arrangements falling within the scope of the appended claims.

The foregoing is provided for purposes of illustrating, explaining, and describing embodiments of this disclosure. Modifications and adaptations to these embodiments will be apparent to those skilled in the art and may be made without departing from the scope or spirit of the disclosure. Upon reviewing the embodiments, it would be evident to an artisan with ordinary skill in the art that said embodiments can be modified, reduced, or enhanced without departing from the scope and spirit of the claims described below.

What is claimed is:

1. A system, comprising:
   a set of computer-executable instructions; and
   a processor or processors that execute the set of instructions, wherein when executed, the set of instructions cause the processor or processors to perform operations comprising
   identifying a plurality of requested upload operations;
   associating each of the identified upload operations with a corresponding transaction in a journal of a hybrid cloud cache;
   determining a transaction identifier assigned to each of the corresponding transactions by the hybrid cloud cache, wherein the identifier increases in value based on an order in which each transaction entered the hybrid cloud cache;
   grouping the plurality of upload operations into a set of upload operations;
   concurrently executing the transactions associated with each of the set of upload operations; and
   executing logic to maintain transactional integrity of the hybrid cloud cache, wherein the logic further comprises
     if a transaction finishes an upload operation and there is a transaction associated with the set of upload operations with an earlier transaction identifier which has a pending upload and which is the most recent unexecuted transaction associated with the set of upload operations, then adding the transaction that finished the upload operation and a dependency queue associated with that transaction to a dependency queue of the transaction with the earlier transaction identifier; and
     if the transaction that finished the upload operation has an oldest transaction identifier of the transactions associated with the set of upload operations, then adding a PUSHDONE entry for the transaction that finished the upload operation and a PUSHDONE entry for the transactions that depend on the transaction that finished the upload operation to the hybrid cloud cache journal.

2. The system of claim 1, wherein each of the requested upload operations is a request to upload a file or a folder to a cloud platform.

3. The system of claim 1, wherein the operations performed by the processor or processors further comprise removing the transaction that finished the upload operation from the transactions associated with the set of upload operations when the transaction that finished has a PUSHDONE entry added to the hybrid cloud cache journal.

4. The system of claim 1, wherein grouping the plurality of upload operations into a set of upload operations and concurrently executing the transactions associated with each of the set of upload operations further comprises:
   identifying a subset of the plurality of upload operations that have a common characteristic; and
   concurrently executing the transactions associated with each of the subset of upload operations.

5. The system of claim 4, wherein the common characteristic is one or more of a dependency between the transactions associated with each of the subset of upload operations, a common type of object to be uploaded, an object size less than a predetermined amount to be uploaded, or a time interval within which each of the upload operations was requested.

6. The system of claim 1, wherein the system concurrently executes the transactions associated with each of the set of upload operations by performing each upload operation using a separate connection to a cloud platform.

7. The system of claim 1, wherein the dependency queue contains information comprising one or more of a transaction identifier, a type of operation associated with the transaction, and a location of a data structure containing additional information about the transaction, wherein the additional information comprises one or more of the transaction creation time and the transaction size.

8. A method, comprising:
identifying a plurality of requested upload operations;
associating each of the identified upload operations with a corresponding transaction in a journal of a hybrid cloud cache;
determining a transaction identifier assigned to each of the corresponding transactions by the hybrid cloud cache, wherein the identifier increases in value based on an order in which each transaction entered the hybrid cloud cache;
grouping the plurality of upload operations into a set of upload operations;
concurrently executing the transactions associated with each of the set of upload operations; and
executing logic to maintain transactional integrity of the hybrid cloud cache, wherein the logic further comprises
if a transaction finishes an upload operation and there is a transaction associated with the set of upload operations with an earlier transaction identifier which has a pending upload and which is the most recent unexecuted transaction associated with the set of upload operations, then adding the transaction that finished the upload operation and a dependency queue associated with that transaction to a dependency queue of the transaction with the earlier transaction identifier; and
if the transaction that finished the upload operation has an oldest transaction identifier of the transactions associated with the set of upload operations, then adding a PUSHDONE entry for the transaction that finished the upload operation and a PUSHDONE entry for the transactions that depend on the transaction that finished the upload operation to the hybrid cloud cache journal.

9. The method of claim 8, wherein each of the requested upload operations is a request to upload a file or a folder to a cloud platform.

10. The method of claim 8, further comprising removing the transaction that finished the upload operation from the transactions associated with the set of upload operations when the transaction that finished has a PUSHDONE entry added to the hybrid cloud cache journal.

11. The method of claim 8, wherein grouping the plurality of upload operations into a set of upload operations and concurrently executing the transactions associated with each of the set of upload operations further comprises:
identifying a subset of the plurality of upload operations that have a common characteristic; and
concurrently executing the transactions associated with each of the subset of upload operations.

12. The method of claim 11, wherein the common characteristic is one or more of a dependency between the transactions associated with each of the subset of upload operations, a common type of object to be uploaded, an object size less than a predetermined amount to be uploaded, or a time interval within which each of the upload operations was requested.

13. The method of claim 8, wherein the method concurrently executes the transactions associated with each of the set of upload operations by performing each upload operation using a separate connection to a cloud platform.

14. The method of claim 8, wherein the dependency queue contains information comprising one or more of a transaction identifier, a type of operation associated with the transaction, and a location of a data structure containing additional information about the transaction, wherein the additional information comprises one or more of the transaction creation time and the transaction size.

15. A non-transitory computer readable medium including a set of computer-executable instructions, which when executed by a processor or processors, cause the processor or processors to perform operations comprising:
identifying a plurality of requested upload operations;
associating each of the identified upload operations with a corresponding transaction in a journal of a hybrid cloud cache;
determining a transaction identifier assigned to each of the corresponding transactions by the hybrid cloud cache, wherein the identifier increases in value based on an order in which each transaction entered the hybrid cloud cache;
grouping the plurality of upload operations into a set of upload operations;
concurrently executing the transactions associated with each of the set of upload operations; and
executing logic to maintain transactional integrity of the hybrid cloud cache, wherein the logic further comprises
if a transaction finishes an upload operation and there is a transaction associated with the set of upload operations with an earlier transaction identifier which has a pending upload and which is the most recent unexecuted transaction associated with the set of upload operations, then adding the transaction that finished the upload operation and a dependency queue associated with that transaction to a dependency queue of the transaction with the earlier transaction identifier; and
if the transaction that finished the upload operation has an oldest transaction identifier of the transactions associated with the set of upload operations, then adding a PUSHDONE entry for the transaction that finished the upload operation and a PUSHDONE entry for the transactions that depend on the transaction that finished the upload operation to the hybrid cloud cache journal.

16. The non-transitory computer readable medium of claim 15, wherein the operations further comprise removing the transaction that finished the upload operation from the transactions associated with the set of upload operations when the transaction that finished has a PUSHDONE entry added to the hybrid cloud cache journal.

17. The non-transitory computer readable medium of claim 15, wherein grouping the plurality of upload operations into a set of upload operations and concurrently executing the transactions associated with each of the set of upload operations further comprises:
identifying a subset of the plurality of upload operations that have a common characteristic; and
concurrently executing the transactions associated with each of the subset of upload operations.

18. The non-transitory computer readable medium of claim 17, wherein the common characteristic is one or more of a dependency between the transactions associated with each of the subset of upload operations, a common type of object to be uploaded, an object size less than a predetermined amount to be uploaded, or a time interval within which each of the upload operations was requested.

19. The non-transitory computer readable medium of claim 15, wherein the processor or processors concurrently execute the transactions associated with each of the set of file upload operations by performing each upload operation using a separate connection to a cloud platform.

20. The non-transitory computer readable medium of claim 15, wherein the dependency queue contains information comprising one or more of a transaction identifier, a type of operation associated with the transaction, and a location of a data structure containing additional information about the transaction, wherein the additional information comprises one or more of the transaction creation time and the transaction size.

\* \* \* \* \*